United States Patent
Graziosi et al.

(10) Patent No.: US 11,741,634 B2
(45) Date of Patent: Aug. 29, 2023

(54) SYNCHRONIZATION OF DECODED FRAMES BEFORE POINT CLOUD RECONSTRUCTION

(71) Applicant: SONY GROUP CORPORATION, Tokyo (JP)

(72) Inventors: Danillo Graziosi, San Jose, CA (US); Alexandre Zaghetto, San Jose, CA (US); Ali Tabatabai, San Jose, CA (US); Vladyslav Zakharchenko, Sunnyvale, CA (US)

(73) Assignee: SONY GROUP CORPORATION, Tokyo (JP)

( * ) Notice: Subject to any disclaimer, the term of this patent is extended or adjusted under 35 U.S.C. 154(b) by 216 days.

(21) Appl. No.: 17/066,434

(22) Filed: Oct. 8, 2020

(65) Prior Publication Data

US 2021/0110577 A1    Apr. 15, 2021

Related U.S. Application Data

(60) Provisional application No. 62/912,928, filed on Oct. 9, 2019.

(51) Int. Cl.
*G06T 3/40*     (2006.01)
*H04N 19/172*     (2014.01)
(Continued)

(52) U.S. Cl.
CPC .................. *G06T 9/00* (2013.01); *G06T 3/40* (2013.01); *H04N 19/172* (2014.11);
(Continued)

(58) Field of Classification Search
CPC ........... G06T 9/00; G06T 3/40; H04N 19/597; H04N 19/46; H04N 19/184; H04N 19/172
See application file for complete search history.

(56) References Cited

U.S. PATENT DOCUMENTS 7,096,481 B1    8/2006    Forecast et al.
2019/0087979 A1    3/2019    Mammou et al.
(Continued)

FOREIGN PATENT DOCUMENTS

JP            2010516103 A       5/2010
WO    WO-2020060813 A1 *    3/2020 ............... G06T 9/00
WO    WO-2021022265 A2 *    2/2021 ............. G06T 9/001

OTHER PUBLICATIONS

"Call for Proposals for Point Cloud Compression V2", MPEG 3DG and Requirements, International Organization For Standardization, ISO/IEC JTC1/SC29/WG11 MPEG2017/N16763, Hobart, AU, Apr. 2017, 21 pages.

(Continued)

*Primary Examiner* — Dave Czekaj
*Assistant Examiner* — Berteau Joisil
(74) *Attorney, Agent, or Firm* — Chip Law Group

(57) ABSTRACT

A method and Video-Based Point Cloud Compression (V-PCC) decoder for synchronization of decoded frames before point cloud reconstruction is provided. A V-PCC bit-stream which includes encoded frames associated with a point cloud sequence is received. Sub-streams of the received V-PCC bit-stream are decoded by a group of video decoders of the V-PCC decoder to generate V-PCC components, such as an attribute component, a geometry component, an occupancy map component, and an atlas component. A release of the attribute component, the geometry component, the occupancy map component, and the atlas component to the reconstruction unit is delayed based on a first output delay, a second output delay, a third output delay, and a fourth output delay, respectively. The delayed release synchronizes the attribute component, the geometry component, the occupancy map component, and the atlas component with each other before the reconstruction unit reconstructs a point cloud based on the V-PCC components.

19 Claims, 7 Drawing Sheets

(51) Int. Cl.
  *G06T 9/00* (2006.01)
  *H04N 19/46* (2014.01)
  *H04N 19/184* (2014.01)
  *H04N 19/597* (2014.01)

(52) U.S. Cl.
  CPC .......... *H04N 19/184* (2014.11); *H04N 19/46* (2014.11); *H04N 19/597* (2014.11)

(56) References Cited

U.S. PATENT DOCUMENTS

| | | | |
|---|---|---|---|
| 2019/0114504 A1 | 4/2019 | Vosoughi | |
| 2022/0141487 A1* | 5/2022 | Oh | H04N 21/816 375/240.08 |

OTHER PUBLICATIONS

3DG "[V-PCC] V-PCC Test Model v6", W18457 [online], May 18, 2019 [retrieved on Dec. 22, 2020]. Retrieved from <https://www.interdigital.com/download/5d1a5b3d566d0707780004b8>, paragraphs "3.2.1 Principle", "3.3.1 Encoder parameters".

Leonardo's Blog. On the convergence of Video and 3D Graphics [online], Sep. 7, 2019 [retrieved on Dec. 17, 2020]. Retrieved from <https://blog.chiariglione.org/on-the-convergence-of-video-and-3d-graphics, paragraphs "Point cloud compression", "3DoF+ compression".

Schwarz S. et al. Emerging MPEG Standards for Point Cloud Compression [online], Dec. 10, 2018 [retrieved on Dec. 22, 2020]. Retrieved from <https://ieeexplore.ieee.org/document/8571288>.

Suzuki, et al., "PCC V-PCC Conformance Point", Sony, International Organization for Standardization, Organisation Internationale De Normalisation, Coding of moving picturesand audio, XP030192167, 124. MPEG Meeting, Oct. 3, 2018, 05 pages.

Tabatabai, et al., "[V-PCC] Hypothetical Reference Decoder for Atlas data", Sony Corporation of America, FutureWei Technologies Inc., International Organization for Standardization, Organisation Internationale De Normalisation, Coding of moving pictures and audio, XP030221562, 128. MPEG Meeting, Oct. 7, 2019, 23 pages.

Ye-Kui Wang, "On V-PCC high-level syntax", Futurewei Technologies Inc., International Organization for Standardization, Organisation Internationale De Normalisation, Coding of moving pictures and audio, 127. MPEG Meeting, XP030222282, Jun. 27, 2019, 03 pages.

Tabatabai, et al., "[V-PCC] Requirements for conformance point B", Sony Corporation of America, FutureWei Technologies Inc., International Organization for Standardization, Organisation Internationale De Normalisation, Coding of moving pictures and audio, 128. MPEG Meeting, XP030221626, Oct. 9, 2019, 15 pages.

Extended European Search Report of EP Application No. 20874572.9, dated Oct. 20, 2022, 12 pages.

Euee S. Jang et al., "Video-Based Point-Cloud-Compression Standard in MPEG: From Evidence Collection to Committee Draft", IEEE Signal Processing Magazine, vol. 36, Issue: 3, Apr. 26, 19, pp. 118-121, URL:https://ieeexplore.IEEE.org/stamp/stamp.jsp?tp=&arnumber=8700674>.

* cited by examiner

CPB = Coded Picture Buffer
DPB = Decoded Picture Buffer
CAB = Coded Atlas Buffer
DAB = Decoded Atlas Buffer
CF = Conformance Point

FIG. 2

SYNCHRONIZATION OF DECODED FRAMES BEFORE POINT CLOUD RECONSTRUCTION

CROSS-REFERENCE TO RELATED APPLICATIONS/INCORPORATION BY REFERENCE

This application claims priority to U.S. Provisional Patent Application Ser. No. 62/912,928 filed on Oct. 9, 2019, the entire content of which is hereby incorporated herein by reference.

FIELD

Various embodiments of the disclosure relate to video-based point cloud compression (V-PCC). More specifically, various embodiments of the disclosure relate to a synchronization of decoded frames before point cloud reconstruction.

BACKGROUND

Advancements in the field of three-dimensional (3D) scanning technologies have provided the ability to create dynamic as well as static 3D geometrical representations of 3D objects. Dynamic 3D point clouds are one example of the 3D geometrical representations, which are increasingly adopted for different applications, such as free viewpoint video (FVV) for sports or a live event relay broadcasting, geographic information systems, cultural heritage representations, or autonomous navigation of vehicles. Typically, dynamic 3D point clouds include many point cloud frames, where each point cloud frame include a large number of unstructured 3D points (e.g., each point having X, Y, and Z coordinates) along with associated attributes, for example, texture including colors or reflectance. A 3D image of an object described by a 3D point cloud may contain order of magnitudes of raw data, which makes data storage, processing, and transmission a challenging task for any practical application. One of the techniques to encode a dynamic 3D point cloud is referred to as video-based point cloud compression (V-PCC), where conventional video codecs are used to encode geometry and texture of the dynamic 3D point cloud. It may be desirable to have an efficient decompression for dynamic 3D point clouds.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A Video-Based Point Cloud Compression (V-PCC) decoder and method for a synchronization of decoded frames before point cloud reconstruction is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 2 is a diagram of an architecture of a V-PCC decoder to illustrate implementation of exemplary approaches for synchronization of decoded frames before point cloud reconstruction, in accordance with an embodiment of the disclosure.

DETAILED DESCRIPTION

The following described implementations may be found in the disclosed method and Video-Based Point Cloud Compression (V-PCC) decoder for synchronization of decoded frames before point cloud reconstruction. The disclosure provides two separate approaches to synchronize decoded frames of different V-PCC components, which are usually temporally not aligned because of different Group of Pictures (GOP) structure. For a reconstruction unit of a V-PCC decoder to be able to reconstruct a single frame of a point cloud sequence, a conformance point at an output of each video decoder of the V-PCC decoder may require all the V-PCC components to be temporally aligned before such components are transferred to the reconstruction unit. All the V-PCC components may be required to reconstruct a full point cloud frame of a point cloud sequence. In case such components are not aligned, it may be difficult to satisfy requirements of another conformance point at the output of the reconstruction unit.

In the disclosure, two separate approaches are provided to temporally align the V-PCC components, such as attribute frames, geometry frames, occupancy maps, and atlas frames. In the first approach, each video decoder may be configured to delay the release of a respective V-PCC component from a decoded picture/atlas buffer of the respective decoder so that all the V-PCC components are temporally aligned before such components are transferred to the reconstruction unit for a reconstruction of a point cloud. In the second approach, the group of video decoders may be allowed to output the V-PCC components according to their GOP structure, but an external buffer may be used to hold such components for a duration. When all required V-PCC components are in the external buffer, such components may be removed from the external buffer and may be released to the reconstruction unit for reconstruction of a point cloud. In this approach, the video decoders may not be changed, but additional buffer management may be required. The disclosed method ensures that decoded frames or V-PCC components conform to requirements for reconstruction of a point cloud frame and also provide a wide level of flexibility in the reconstruction of the point cloud frame.

Figure 1:
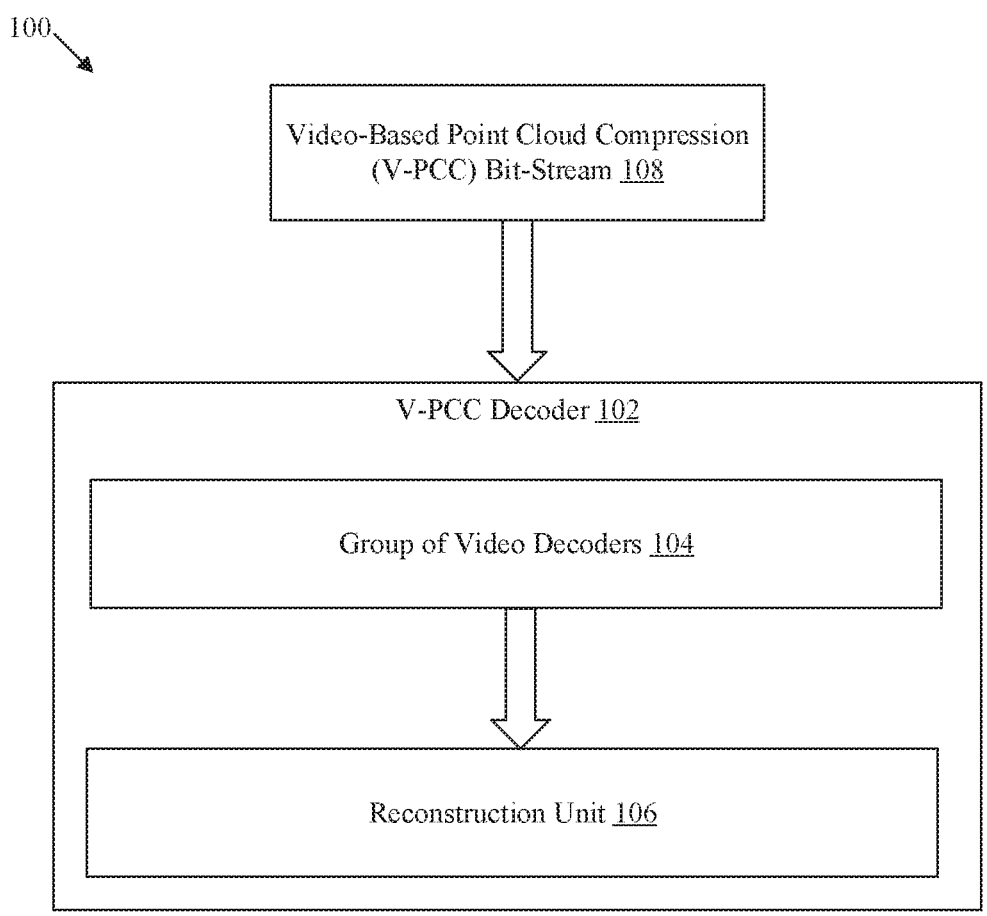
FIG. 1 is a diagram of an exemplary Video-based Point Cloud Compression (V-PCC) decoder for synchronization of decoded frames before point cloud reconstruction, in accordance with an embodiment of the disclosure.

FIG. 1 is a diagram of an exemplary Video-based Point Cloud Compression (V-PCC) decoder for synchronization of decoded frames before point cloud reconstruction, in accordance with an embodiment of the disclosure. With reference to FIG. 1, there is shown a block diagram 100 of a Video-based Point Cloud Compression (V-PCC) decoder 102. The V-PCC decoder 102 may include a group of video decoders 104 and a reconstruction unit 106. The V-PCC decoder 102 may also include other components, such as a color reconstruction unit, which are omitted from the disclosure for the sake of brevity.

The V-PCC decoder 102 may include suitable logic, circuitry, interfaces, and/or code that may be configured to receive a V-PCC bit-stream 108 from a data source, such as a media storage device. The V-PCC bit-stream 108 may include encoded frames associated with a point cloud sequence. The V-PCC decoder 102 may decode the received V-PCC bit-stream 108 and may perform a frame-by-frame reconstruction of the point cloud sequence. The process of frame-by-frame reconstruction may be repeated until the entire point cloud sequence is reconstructed.

In an embodiment, the V-PCC decoder 102 may be implemented on a Graphical Processing Unit (GPU), a Central Processing Unit (CPU), a Reduced Instruction Set Computing (RISC) processor, an Application-Specific Integrated Circuit (ASIC) processor, a Complex Instruction Set Computing (CISC) processor, a co-processor, or a combination thereof. In another embodiment, the V-PCC decoder 102 may be implemented as a specialized hardware decoder. Examples of the specialized hardware decoder may include, but are not limited to, a field programmable gate array (FPGA), programmable logic devices (PLDs), an application specific integrated circuit (ASIC), a programmable ASIC (PL-ASIC), application specific integrated parts (AS-SPs), and a System-on-Chip (SOC) based on standard microprocessors (MPUs) or digital signal processors (DSPs). In another embodiment, the V-PCC decoder 102 may be implemented as a combination of stored programmable instructions and specialized or general-purpose decoder circuitry.

Each of the group of video decoders 104 may include suitable logic, circuitry, interfaces, and/or code that may be configured to decode a sub-stream of the V-PCC bit-stream 108 to generate a V-PCC component. The group of video decoders 104 may generate V-PCC components, such as an attribute component (e.g., attribute frame(s)), a geometry component (e.g., geometry frame(s)), an occupancy map component (e.g., occupancy map(s)), and an atlas component (e.g., atlas frame(s)) by decoding the V-PCC bit-stream 108. In an embodiment, each of the group of video decoders 104 may be implemented based on a standard video codec, such as a High Efficiency Video Coding (HEVC) codec or an Advanced Video Coding (AVC) codec. In another embodiment, each of the group of video decoders 104 may be implemented based on a non-standard or proprietary video codec.

The reconstruction unit 106 may include suitable logic, circuitry, interfaces, and/or code that may be configured to execute a frame-by-frame reconstruction of a point cloud sequence. For example, the reconstruction unit 106 may receive at least a unit size of the generated V-PCC components which may be required to reconstruct one full frame (i.e. a 3D point cloud) of the point cloud sequence. The reconstruction unit 106 may be implemented as one of a generalized or special-purpose hardware component of the V-PCC decoder 102, stored programmable instructions, or a combination thereof.

Typically, a V-PCC encoder may encode a point cloud sequence to generate the V-PCC bit-stream 108. The V-PCC encoder encodes the point cloud sequence by creating videos of the point cloud attributes (e.g. texture), geometry, occupancy map and encoding such videos with video encoders. V-PCC defines a stream-like structure of metadata information that indicates parameters of the point cloud sequence and other related information, such as patch sizes and location.

For encoding, volumetric data i.e. a point cloud may be segmented into regions of connected components, called 3D patches. Application of an orthographic projection onto a plane along in either x, y, or z axes to each 3D patch, may result in a set of 2D patch points. As part of an atlas component, an atlas frame may refer to a collection of two-dimensional (2D) bounding boxes that may be the projection of their corresponding 3D patch bounding boxes. Packing may refer to the placement of the 2D bounding boxes within each atlas frame through the application of a series of transforms, e.g., rotation and translation. In general, the atlas frame may provide information about the coordinate transforms applied during the 3D to 2D patch generation and packing process.

From each point cloud in the point cloud sequence, the V-PCC encoder may extract a number of components. For example, the V-PCC encoder may extract four components, such as binary images, called occupancy map(s), geometry frame(s), attribute frame(s), and atlas frame(s). Geometry frames(s) may carry information about a third coordinate, namely the distance between the 3D points of a point cloud and the projected 2D points. Similarly, attribute frames(s) may be used to carry attribute information associated with each point, such as color or reflectance information. Since a 3D patch may have multiple points that could all be projected onto the same 2D point, several component may be extracted to keep a fraction of overlapped points (e.g., near image vs. far image to store inner surface points vs. outer surface points). An occupancy map may be a binary image and a pixel intensity of 1 may indicate the presence of at least a single valid point cloud. The atlas frame may include information, such as a position and an orientation of patches, or a block size used in a patch packing operation. Such information may be required to reconstruct the point cloud of the point cloud sequence.

In operation, the V-PCC decoder 102 may receive the V-PCC bit-stream 108 that may include encoded frames associated with a point cloud sequence. In an embodiment, the V-PCC decoder 102 may apply a de-multiplexing operation to split the V-PCC bit-stream 108 into sub-streams. The V-PCC bit-stream 108 may include sub-streams, such as an attribute sub-stream, a geometry sub-stream, an occupancy map sub-stream, and an atlas sub-stream. Thereafter, each sub-stream may be input to a respective decoder of the group of video decoders 104. The group of video decoders 104 may decode the sub-streams of the V-PCC bit-stream 108 to generate the V-PCC components, such as an attribute component, a geometry component, an occupancy map component, and an atlas component.

V-PCC does not enforce the underlying video encoders to have the same Group of Pictures (GOP) structure, which may mean that the video frames of individual V-PCC components at the encoder side may be encoded in different orders. For a system, such as the V-PCC decoder 102 to be able to reconstruct a single frame of the point cloud sequence, one V-PCC unit must be transferred to the reconstruction unit 106. Herein, one V-PCC unit may include the V-PCC components which may be required to reconstruct a full point cloud frame of the point cloud sequence. A key challenge however in a reconstruction process may be related to the need for a temporal alignment of decoded component, i.e. the V-PCC components. This may be because of the lack of constraint on prediction structure across V-PCC sub-streams, which could result in different frame duration and coding orders.

In a basic profile of V-PCC, it may be required that all elements of the sub-streams are temporally aligned; however, in other profiles the temporal structure may vary for sub-bit-streams. This may lead to a problem of an output delay adjustment on a video decoder part of the V-PCC decoder 102. For example, the V-PCC decoder 102 may include a conformance point "A" at the output of the group of video decoders 104 to ensure output delay adjustment of the V-PCC components.

Before all V-PCC components are released to the reconstruction unit 106 for reconstruction of one full point cloud frame of a point cloud sequence, all the V-PCC components may have to be temporally aligned. Such components are usually temporally not aligned because of different GOF structure associated with encoded frames within each sub-stream of the V-PCC bit-stream 108. In the disclosure, two separate approaches are mentioned to synchronize the V-PCC components, such as the attribute component, the geometry component, the occupancy map component, and the atlas component. The key difference between the two approaches is whether the modifications needed for delay adjustments or synchronization are done at decoded picture/atlas buffer or at V-PCC composition buffer level (i.e. an external unit buffer for holding V-PCC components before reconstruction).

In the first approach, after each video decoder in the group of video decoders 104 decodes a respective V-PCC sub-stream, the V-PCC decoder 102 may delay the release of each respective V-PCC component (i.e. frame(s) decoded from a respective V-PCC sub-stream) from a decoded picture buffer/decoded atlas buffer (DPB/DAB) associated with the respective video decoder. Such delay may be applied so that all the V-PCC components are temporally aligned when made available to the reconstruction unit 106 for a reconstruction of a point cloud. Details associated with the first approach are further provided, for example, in FIG. 2.

In the second approach, the group of video decoders 104 may be allowed to output the V-PCC components, such as the attribute component, the geometry component, the occupancy map component, and the atlas component according to their GOP structure, but a V-PCC composition buffer (as shown in FIG. 2, for example) may be used to hold all the components for a duration. When all required V-PCC components are in the V-PCC composition buffer (i.e. an external buffer), such components may be removed from the V-PCC composition buffer and may be released to the reconstruction unit 106 for a reconstruction of a point cloud of the point cloud sequence. Details associated with the second approach are further provided, for example, in FIG. 2.

In both the approaches, the V-PCC decoder 102 may be configured to delay a release of the attribute component to the reconstruction unit 106 based on a first output delay. Similarly, the V-PCC decoder 102 may be configured to delay a release of the geometry component to the reconstruction unit 106 based on a second output delay. The V-PCC decoder 102 may be further configured to delay release of the occupancy map component to the reconstruction unit 106 based on a third output delay and delay a release of the atlas component to the reconstruction unit 106 based on a fourth output delay.

Each of the first output delay, the second output delay, the third output delay, or the fourth output delay may be specified in timing messages, such as Picture/Atlas timing Supplemental Enhancement Information (SEI) messages. Such messages may be included with individual access units (AUs), as part of respective sub-streams of the received V-PCC bit-stream 108. The delayed release may synchronize (i.e. temporally align) the V-PCC components, such as the attribute component, the geometry component, the occupancy map component, and the atlas component with each other before the reconstruction unit 106 reconstructs a point cloud based on such V-PCC components (temporally aligned).

FIG. 2 is a diagram of an architecture of a V-PCC decoder to illustrate implementation of exemplary approaches for synchronization of decoded frames before point cloud reconstruction, in accordance with an embodiment of the disclosure. FIG. 2 is explained in conjunction with elements from FIG. 1. With reference to FIG. 2, there is shown a block diagram 200 of an architecture of the V-PCC decoder 102 for implementation of exemplary approaches for synchronization (i.e. temporal alignment) of various V-PCC components, which are typically required to reconstruct one full frame of a point cloud sequence. In the block diagram 200, there is shown a de-multiplexer 202 and the group of video decoders 104 communicatively coupled to the de-multiplexer 202. The group of video decoders 104 include an attribute video decoder 204, a geometry video decoder 206, an occupancy map decoder 208, and an atlas frame decoder 210. For the attribute video decoder 204, there is shown a first coded picture buffer (CPB) 204A and a first decoded picture buffer (DPB) 204B. For the geometry video decoder 206, there is shown a second CPB 206A and a second DPB 206B. For the occupancy map decoder 208, there is shown a third CPB 208A and a third DPB 208B. For the atlas frame decoder 210, there is shown a coded atlas buffer (CAB) 210A and a decoded atlas buffer (DAB) 210B.

There is further shown a V-PCC composition buffer 220, the reconstruction unit 106, and two conformance points (A, B). The conformance point A may require an output order conformance and an output timing conformance at the output of the set of the video decoders 104. Similarly, the conformance point B may require a correct point cloud reconstruction at the output of the reconstruction unit 106 of the V-PCC decoder 102. CPB and DPB are typically implemented with a video decoder, such as an HEVC decoder. Therefore, details of CPB and DPB are omitted from the disclosure for the sake of brevity.

In operation, the de-multiplexer 202 may receive the V-PCC bit-stream 108 and may de-multiplex the received V-PCC bit-stream 108 into different sub-streams, for example, an attribute sub-stream, a geometry sub-stream, an occupancy map sub-stream, and an atlas sub-stream. For generating each of the V-PCC components, the V-PCC decoder 102 may transfer an encoded AU from an attribute sub-stream, a geometry sub-stream, an occupancy map sub-stream, and an atlas sub-stream to the first CPB 204A, the second CPB 206A, the third CPB 208A, and the CAB 210A, respectively. From each of the CPBs/CAB, a respective video decoder may receive respective encoded AU and may decode the encoded AU to generate a V-PCC component. After decoding, each of such V-PCC components may be transferred to a respective DPB/DAB of the V-PCC decoder 102.

An exemplary first approach for output delay adjustment (or temporal alignment) of V-PCC components is described herein. Conventionally, a Hypothetical Reference Decoder (HRD) in a video codec, such as H.264/AVC or H.265/HEVC, refers to a hypothetical buffer model. Parameters of the HRD may provide the means by which an encoder may signal to a decoder the time at which an encoded Access Unit (AU) bitstream will be available for decoding, and subsequently the time a decoded AU can be output, i.e. its composition time. Such parameters may include, for example, a bit rate, CPB/CAB size, initial CPB/CAB removal delay, and timing information which may be carried by V-PCC Video Usability information (VUI). HRD-related SEI messages, such as Picture Buffering period, Atlas Buffering period, Picture timing, and Atlas frame timing, may provide timing information needed to extract CPB and CAB AU removal times as well as DPB and DAB output composition times. Note that HRD related parameters can either be embedded into the V-PCC bit-stream 108 or provided through external means (e.g., through system level information).

The composition time of a decoded AU (or decoded frame(s)) of a V-PCC component may be defined as a removal time (remTime[n][i]) of a coded AU (included in a sub-stream of the V-PCC bit-stream 108), added with an output delay, outDelay[n][i], where n and i refer to $n_{th}$ AU of an $i_{th}$ V-PCC component, respectively. For each of the V-PCC components, such as an attribute component, a geometry component, and an occupancy map component, a respective output delay may be extracted from a syntax element (such as pic_cpb output_delay) in a picture timing SEI message. For a V-PCC component, such as the atlas component, the output delay may be determined from a syntax element (such as aft_cab_output_delay_minus1) in an atlas timing SEI message. It may be possible to modify the composition time based on a new output delay value. The first exemplary approach is to derive an appropriate delay offset that may ensure a proper alignment of decoded frames in all of the V-PCC components before such frames are input to the V-PCC composition buffer 220 of the AUs according to their modified compositionTime[n][i].

In an embodiment, the V-PCC decoder 102 may receive a first picture timing SEI message associated with an attribute sub-stream of the V-PCC bit-stream 108. In order to delay the release of attribute component 212 (i.e. a first V-PCC component) with other V-PCC components, the V-PCC decoder 102 may extract a first output delay from the received first picture timing SEI message and may determine a delay offset associated with the attribute component 212 based on the extracted first output delay. The first output delay (also referred to as outDelay[n][i]) may be extracted as a value of an $i_{th}$ (e.g., i=0) V-PCC component of a syntax element (pic_dpb_output_delay) in the first picture timing SEI message associated with an access unit (n) in the attribute sub-stream. Thereafter, the V-PCC decoder 102 may modify a first composition time (also referred to as compositionTime[n][i]) at which the attribute component 212 is to be removed from the first DPB 204B. The first composition time may be modified based on the extracted first output delay and the determined delay offset. Details associated with the determination of the delay offset are provided, for example, in FIGS. 3A-3B. The V-PCC decoder 102 may remove the attribute component 212 from the first DPB 204B at the modified first composition time. The removal at the modified first composition time may correspond to a delayed release of the attribute component 212 for reconstruction.

In an embodiment, the V-PCC decoder 102 may receive a second picture timing SEI message associated with a geometry sub-stream of the V-PCC bit-stream 108. In order to delay the release of geometry component 214 (i.e. a second V-PCC component) with other V-PCC components, the V-PCC decoder 102 may extract a second output delay from the received second picture timing SEI message and may determine a delay offset associated with the geometry component 214 based on the extracted second output delay. The second output delay (also referred to as outDelay[n][i]) may be extracted as a value of an it (e.g., i=1) V-PCC component of a syntax element (pic_dpb_output_delay) in the second picture timing SEI message associated with an access unit (n) in the geometry sub-stream. Thereafter, the V-PCC decoder 102 may modify a second composition time (also referred to as compositionTime[n][i]) at which the geometry component 214 is to be removed from the second DPB 206B. The second composition time may be modified based on the extracted second output delay and the determined delay offset. Details associated with the determination of the delay offset are provided, for example, in FIGS. 3A-3B. The V-PCC decoder 102 may remove the geometry component 214 from the second DPB 206B at the modified second composition time. The removal at the modified second composition time may correspond to a delayed release of the geometry component 214 for reconstruction.

In an embodiment, the V-PCC decoder 102 may receive a third picture timing SEI message associated with an occupancy map sub-stream of the V-PCC bit-stream 108. In order to delay the release of occupancy map component 216 (i.e. a third V-PCC component) with other V-PCC components, the V-PCC decoder 102 may extract a third output delay from the received third picture timing SEI message and may determine a delay offset associated with the occupancy map component 216 based on the extracted third output delay. The third output delay (also referred to as outDelay[n][i]) may be extracted as a value of an it (e.g., i=2) V-PCC component of a syntax element (pic_dpb_output_delay) in the third picture timing SEI message associated with an access unit (n) in the occupancy map sub-stream. Thereafter, the V-PCC decoder 102 may modify a third composition time (also referred to as compositionTime[n][i]) at which the occupancy map component 216 is to be removed from the third DPB 208B. The third composition time may be modified based on the extracted third output delay and the determined delay offset. Details associated with the determination of the delay offset are provided, for example, in FIGS. 3A-3B. The V-PCC decoder 102 may remove the occupancy map component 216 from the third DPB 208B at the modified third composition time. The removal at the modified third composition time may correspond to a delayed release of the occupancy map component 216 for reconstruction.

In an embodiment, the V-PCC decoder 102 may receive an atlas timing SEI message associated with an atlas sub-stream of the V-PCC bit-stream 108. In order to delay the release of atlas component 218 (i.e. a fourth V-PCC component) with other V-PCC components, the V-PCC decoder 102 may extract a fourth output delay from the received atlas timing SEI message and may determine a delay offset associated with the atlas component 218 based on the extracted fourth output delay. The fourth output delay (also referred to as outDelay[n][i]) may be extracted as a value of an it (e.g., i=3) V-PCC component of a syntax element (aft_cab_output_delay_minus1) in the atlas timing SEI message associated with an access unit (n) in the atlas sub-stream. Thereafter, the V-PCC decoder 102 may modify a fourth composition time (also referred to as compositionTime[n][i]) at which the atlas component 218 is to be removed from the DAB 210B. The fourth composition time may be modified based on the extracted fourth output delay and the determined delay offset. Details associated with the determination of the delay offset are provided, for example, in FIGS. 3A-3B. The V-PCC decoder 102 may remove the atlas component 218 from the DAB 210B at the modified fourth composition time. The removal at the modified fourth composition time may correspond to a delayed release of the atlas component 218 for reconstruction.

The delayed release may synchronize (i.e. temporally align) the V-PCC components, such as the attribute component 212, the geometry component 214, the occupancy map component 216, and the atlas component 218 with each other before the reconstruction unit 106 reconstructs a point cloud 222 based on such V-PCC components (temporally aligned).

In the first approach, syntax and semantics for SEI and VUI messages (which may be similar to SEI messages used in the H.264/AVC standard and/or the H.265/HEVC standard) are used to refer to HRD, such as CPB/CAB removal times and DPB/DAB output times. However, because of a codec-agnostic nature of V-PCC specification, it may well happen that for certain codecs, such as JPEG, HRD syntax structures may be not supported and may not exist. Thus, there may be a need to rely on any set of syntax elements associated with coded V-PCC components that carry some information equivalent to the information carried in the SEI and VUI syntax structure(s) (described in the first approach). This may be regardless of whether such information is signaled using any other syntax structures within the V-PCC bit-stream 108 or by some other means.

In an exemplary second approach, the modification of the composition times (as described in FIG. 2 and FIGS. 3A-3B for the first approach) may remain similar to the first approach. The difference may be in buffering scheme, i.e. the decoded frame(s)/map(s) from each V-PCC component may be output from respective DPBs/DAB (such as the first DPB 204B, the second DPB 206B, the third DPB 208B, and the DAB 210B) and may be directly input into the V-PCC composition buffer 220, without any modification. The release of such frame(s)/map(s) from the V-PCC composition buffer 220 to the reconstruction unit 106 may be performed according to the modified composition times (as described for the first approach in FIGS. 2, 3A-3B). The second approach may not impact the profile/level requirement of a V-PCC codec. It may instead rely on a V-PCC unit buffer (such as the V-PCC composition buffer 220) to do storage.

The exemplary second approach (also referred to as a codec agnostic approach) for synchronization (i.e. temporal alignment) of various V-PCC components is described herein. After a first sub-stream of the V-PCC bit-stream 108 may be decoded, a first V-PCC component, such as the attribute component 212 may be output from the first DPB 204B and may be stored in the V-PCC composition buffer 220 of the V-PCC decoder 102. Similarly, after a second sub-stream of the V-PCC bit-stream 108 may be decoded, a second V-PCC component, such as the geometry component 214 may be output from the second DPB 206B and may be stored in the V-PCC composition buffer 220. After a third sub-stream of the V-PCC bit-stream 108 may be decoded, a third V-PCC component, such as the occupancy map component 216 may be output from the third DPB 208B and may be stored in the V-PCC composition buffer 220. After a fourth sub-stream of the V-PCC bit-stream 108 may be decoded, a fourth V-PCC component, such as the atlas component 218 may be output from the DAB 210B and may be stored in the V-PCC composition buffer 220.

For each of the stored attribute component 212, the stored geometry component 214, the stored occupancy map component 216, and the stored atlas component 218, the V-PCC decoder 102 may modify a composition time for a removal from the V-PCC composition buffer 220. The composition time for the attribute component 212 may be modified based on the first output delay and/or the delay offset associated with the attribute component 212. The composition time for the geometry component 214 may be modified based on the second output delay and/or the delay offset associated with the geometry component 214. The composition time for the occupancy map component 216 may be modified based on the third output delay and/or the delay offset associated with the occupancy map component 216. The composition time for the atlas component 218 may be modified based on the fourth output delay and/or the delay offset associated with the atlas component 218. Details of the modification of the composition times, extraction of respective output delays, and determination of the respective delay offsets may be same as that for the first approach and are provided in FIGS. 2, 3A, and 3B, for example.

When all required V-PCC components are in the V-PCC composition buffer 220, each of such components may be removed from the V-PCC composition buffer 220 at the modified composition time associated with a respective V-PCC component. The removal of each of the stored attribute component 212, the stored geometry component 214, the stored occupancy map component 216, and the stored atlas component 218 may correspond to a delayed release to the reconstruction unit 106.

Such components may be removed and released for a reconstruction of one full frame (such as the point cloud 222) of the point cloud sequence. In an embodiment, each of the first output delay, the second output delay, the third output delay, and the fourth output delay may be determined based on an atlas/picture timing SEI message, which may be received with an access unit of a respective sub-stream of the V-PCC bit-stream 108.

Figure 3A:
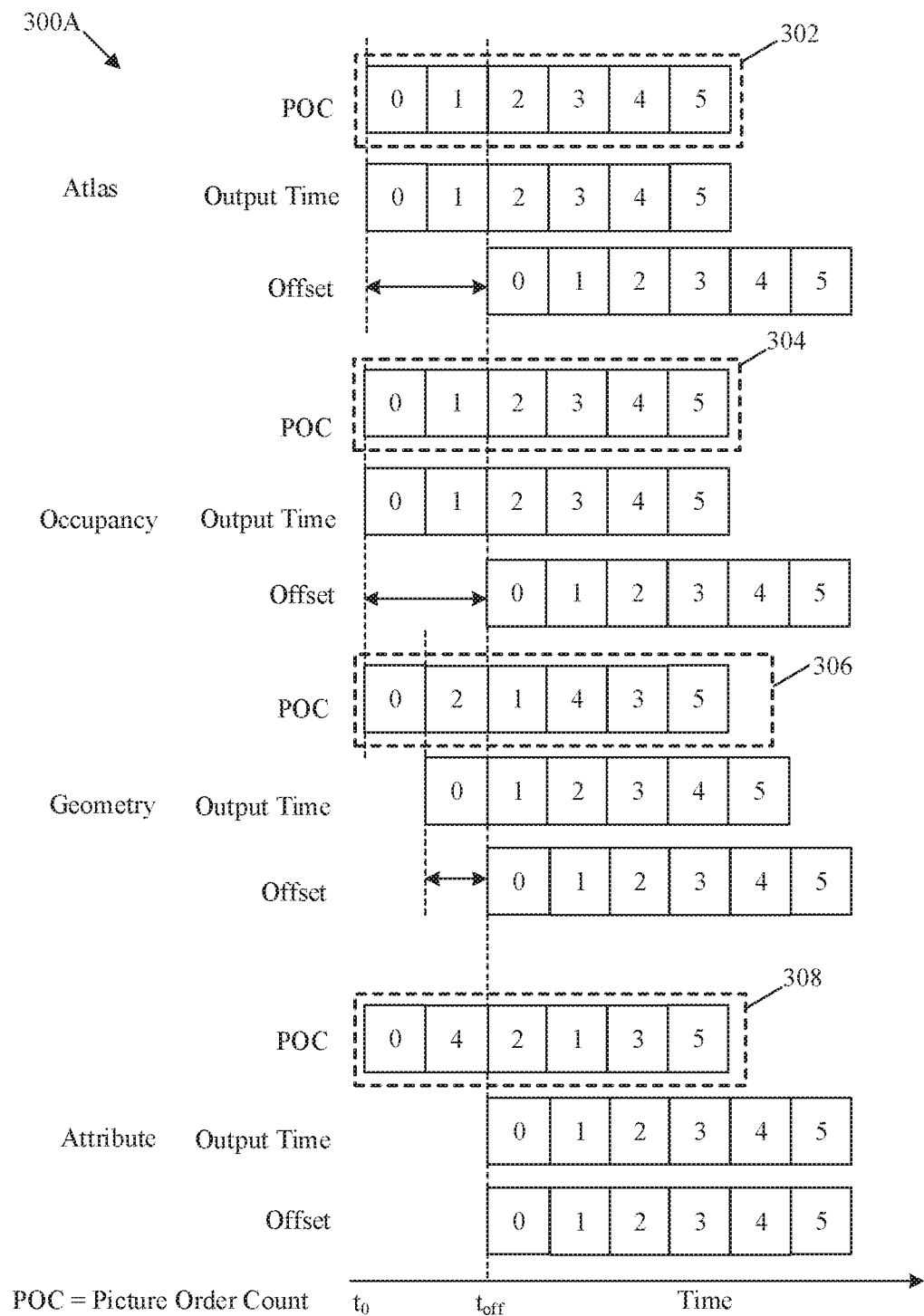
FIG. 3A is a diagram that illustrates an example of sub-bitstreams, each containing a single V-PCC component map, in accordance with an embodiment of the disclosure.

FIG. 3A is a diagram that illustrates an example of sub-bitstreams, each containing a single V-PCC component map, in accordance with an embodiment of the disclosure. FIG. 3A is explained in conjunction with elements from FIG. 1 and FIG. 2. With reference to FIG. 3A, there is shown a diagram 300A that illustrates an example of sub-bit-streams, each containing a single V-PCC component map. In the diagram 300A, there is shown a picture order count (POC) of each of the V-PCC components, such as atlas frames 302 (i.e. an atlas component), occupancy maps 304 (i.e. an occupancy map component), geometry frames 306 (i.e. a geometry component), and attribute frames 308 (i.e. an attribute component). Each of the four V-PCC components include six frames, which may be initially decoded in a specific order (according to a specific Group of Pictures (GOP) structure). In FIG. 3A, the term POC may refer to indices that define the output position of the coded pictures and atlas frames and they may not be necessarily associated directly with the concept of time.

As shown, a video decoder, such as the atlas frames decoder 210 may decode an atlas sub-stream of the V-PCC bit-stream 108 to generate the atlas frames 302 (V-PCC 0) in a first order [0, 1, 2, 3, 4, 5]. The atlas frames 302 may be stored in the DAB 210B after the atlas frames 302 are decoded. Similarly, another video decoder, such as the occupancy map decoder 208 may decode an occupancy map sub-stream of the V-PCC bit-stream 108 to generate the occupancy maps 304 (V-PCC 1) in a second order [0, 1, 2, 3, 3, 4]. The occupancy maps 304 may be stored in the third DPB 208B. As both the first order and the second order are a correct picture order, no reordering may be required before such frames/maps are output for reconstruction of a point cloud. Another video decoder, such as the geometry video decoder 206 may decode a geometry sub-stream to generate the geometry frames 306 (V-PCC 2) in a third order [0, 2, 1, 4, 3, 5]. The geometry frames 306 may be stored in the second DPB 206B. Another video decoder, such as the attribute video decoder 204 may decode an attribute sub-stream to generate the attribute frames 308 (V-PCC 3) in a fourth order [0, 4, 2, 1, 3, 5]. The attribute frames 308 may be stored in the first DPB 204B.

As the POC for both the geometry frames 306 and the attribute frames 308 indicate that the frames are out of order, a reordering may be required, before such frames are output for the reconstruction. As shown, the reordering may result in a delay and an extension in the length of the respective DPBs for the geometry and atlas components by 1 frame and 2 frames, respectively. In other words, the output time (i.e. a composition time) for removal of each of the geometry frames 306 and the attribute frames 308 from respective DPBs may be delayed in comparison to that for the atlas frames 302 and the occupancy maps 304.

In order to temporally synchronize the atlas frames 302, the occupancy maps 304, the geometry frames 306, and the attribute frames 308, a delay offset may be imposed per V-PCC component. As shown, to match the output time (i.e. the composition time) of the geometry frames 306 and the attribute frames 308, the atlas frames 302 may be offset by 2 frames in the DAB 210B and the occupancy maps 304 may be offset by 1 frame in the third DPB 208B. It should be noted that any increase in DPB/DAB buffer sizes due to introduction of the delay offset shall be within the limit set by the signaled profile and level indications.

Details of the modification of a composition time and determination of the delay offset for each of the generated V-PCC components (as described in FIG. 1 and FIG. 2) are provided herein. Let compNum be a total number of V-PCC components, such as an atlas component (i.e. the atlas frames 302), an occupancy map component (i.e. the occupancy maps 304), a geometry component (i.e. the geometry frames 306), and an attribute component (i.e. the attribute frames 308). Let array mapCnt(i) denote the number of map(s) associated with each $i_{th}$ V-PCC component. Herein, mapCnt(i) may be set to 1, if i refers to either an atlas or an occupancy map component, or if the frames of geometry and attributes are coded separately. If the maps are temporally interleaved, it may be set to the number of geometry and attribute frames. Using HRD Video Usability Information (VUI) timing parameters, the V-PCC decoder 102 may determine units of clock (vui_num_units_in_tick) and timing scale (vui_timescale). The clock tick duration (clockTick) may be given by equation (1), as follows:

$$clockTick = \frac{vui\_num\_units\_in\_tick}{vui\_timescale} \quad (1)$$

where, vui_num_units_in_tick may be the number of time units of a clock operating at the frequency vui_time_scale Hz that corresponds to one increment (called a clock tick) of a clock tick counter, and vui_time_scale may be the number of time units that pass in one second. For example, a time coordinate system that measures time using a 27 MHz clock has a vui_time_scale of 27000000. The value of vui_time_scale shall be greater than 0. vui_num_units_in_tick shall be greater than 0. A clock tick, in units of seconds, may be equal to the quotient of vui_num_units_in_tick divided by vui_time_scale. For example, when the picture rate of a video signal is 25 Hz, vui_time_scale may be equal to 27000000 and vui_num_units_in_tick may be equal to 1080000 and consequently a clock tick may be equal to 0.04 seconds.

The clock tick duration per V-PCC component, clockSubTick, may be given by equation (2), as follows:

$$clockSubTick = \frac{clockTick}{compNum} \quad (2)$$

In FIG. 3A, the variable (i) may represent a component number (i.e. an identifier of a V-PCC component) and may be defined on an interval i=[0; compNum).

By way of example, and not limitation, using equation (1) and equation (2), the composition time of an $i_{th}$ V-PCC component may be modified using equation (3), as follows:

compositionTime[n][i]=remTime[n][i]+clockTick×
(outDelay[n][i]+delayOffset[n][i])+ClockSub-
Tick×i (3)

where, n and i may refer to $n_{th}$ Access Unit (AU) of an $i_{th}$ V-PCC component, CompositionTime[n][i] may be the modified composition time after a delay offset per V-PCC component is applied, remTime[n][i] may be a removal time of a coded AU (included in a sub-stream of the V-PCC bit-stream 108) from a respective CPB/CAB of the V-PCC decoder 102, outDelay[n][i] may be extracted from a syntax element in a picture timing SEI message/atlas timing SEI message, and delayOffset[n][i] may be an additional output delay (calculated using equation (4)) to be imposed to temporally synchronize all the V-PCC components.

In order to achieve synchronization, the delay offset (delayOffset[n][i]) may be imposed per V-PCC component with an initial maximum delay set to be 0. The maxInitDelay [n] may be a maximum initial delay, that may be present across all the output delay (outDelay[n][i]), associated with $n_{th}$ AU of the $i_{th}$ V-PCC component. As an example, the delay offset may be determined using equation (4), as follows:

delayOffset[n][i]=max(maxInitDelay[n][i]−comp-
Num) (4)

The maxInitDelay may be calculated using the following method:

maxInitDelay[n]←0
for i←0 to compNum−1 do maxInitDelay[n]=max(maxInitDelay[n],outDelay[n]
    [i])

end for

It should be noted that any increase in DPB buffer sizes, due to the introduction of this additional offset, shall be within the limit set by the signaled profile and level indications. When each of V-PCC components is finally released at the modified composition time (obtained using equation (3) or equation (5) of FIG. 3B), such components may be input to the V-PCC composition buffer 220 (of a unit size).

The V-PCC composition buffer 220 may output all frames/maps from the V-PCC components to the reconstruction unit 106, which may reconstruct the point cloud 222 (corresponds to one frame of a point cloud sequence).

In the determination and modification of the composition time for each V-PCC component, it is assumed that all the AUs associated with each map/frame are available. However, and in reality, it may happen that some AUs corresponding to a given atlas AU are missing. An example approach to compensate for the missing AU may require replication of a last available AU of the V-PCC component.

Figure 3B:
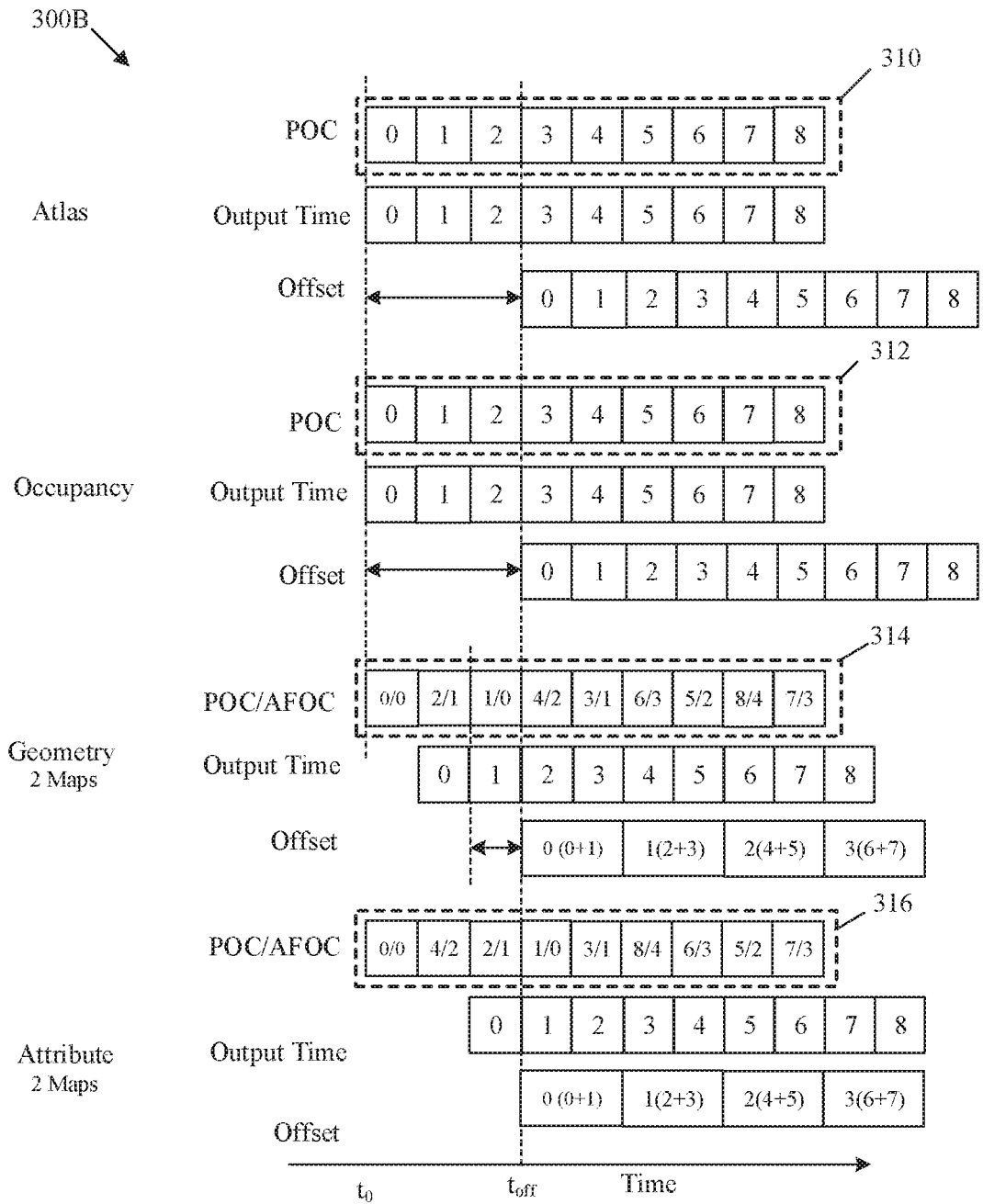
FIG. 3B is a diagram that illustrates an example of single sub-bitstreams containing interleaved maps, in accordance with an embodiment of the disclosure.

FIG. 3B is a diagram that illustrates an example of single sub-bitstreams containing interleaved maps, in accordance with an embodiment of the disclosure. FIG. 3B is explained in conjunction with elements from FIG. 1, FIG. 2, and FIG. 3A. With reference to FIG. 3B, there is shown a diagram 300B that illustrates an example of single sub-bitstreams containing interleaved maps. In the diagram 300B, there is shown a POC of V-PCC components, such as atlas frames 310 (i.e. an atlas component) and occupancy maps 312 (i.e. an occupancy map component). There is also shown a POC/atlas frames order count (AFOC) of geometry frames 314 (i.e. a geometry component) and attribute frames 316 (i.e. an attribute component). Each of four V-PCC components include nine frames, which may be initially decoded in a specific order (according to a specific Group of Pictures (GOP) structure). In FIG. 3B, the term POC/AFOC may refer to indices that define the output position of the coded pictures and atlas frames and they may not be necessarily associated directly with the concept of time.

As shown, a video decoder, such as the atlas frames decoder 210 may decode an atlas sub-stream of the V-PCC bit-stream 108 to generate the atlas frames 310 (V-PCC 0) in a first order [0, 1, 2, 3, 4, 5, 6, 7, 8]. The atlas frames 310 may be stored in the DAB 210B after the atlas frames 310 are decoded. Similarly, another video decoder, such as the occupancy map decoder 208 may decode an occupancy map sub-stream of the V-PCC bit-stream 108 to generate the occupancy maps 312 (V-PCC 1) in a second order [0, 1, 2, 3, 3, 4, 5, 6, 7, 8]. The occupancy maps 312 may be stored in the third DPB 208B. As both the first order and the second order are a correct picture order, no reordering may be required before such frames/maps are output for reconstruction of a point cloud.

Another video decoder, such as the geometry video decoder 206 may decode a geometry sub-stream to generate the geometry frames 314 (V-PCC 2) in a third order [0/0, 2/1, 1/0, 4/2, 3/1, 6/3, 5/2, 8/4, 7/3]. The geometry frames 314 may be stored in the second DPB 206B. Similarly, another video decoder, such as the attribute video decoder 204 may decode an attribute sub-stream to generate the attribute frames 316 (V-PCC 3) in a fourth order [0/0, 4/2, 2/1, 1/0, 3/1, 8/4, 6/3, 5/2, 7/3]. The attribute frames 316 may be stored in the first DPB 204B. Each of such frames may represent 2 interleaved maps (as indicated by 0/0 (indices), for example).

As the POC for both the geometry frames 314 and the attribute frames 316 indicate that the frames are out of order, a reordering may be required, before such frames are output for the reconstruction. As shown, the reordering may result in a delay and an extension in the length of the respective DPBs for the geometry and atlas components by 1 frame and 2 frames, respectively. In other words, the output time (i.e. a composition time) for removal of each of the geometry frames 314 and the attribute frames 316 from respective DPBs may be delayed in comparison to that for the atlas frames 310 and the occupancy maps 312.

In order to temporally synchronize the atlas frames 310, the occupancy maps 312, the geometry frames 314, and the attribute frames 316, a delay offset may be imposed per V-PCC component. As shown, to match the output time (i.e. the composition time), the geometry frames 314 and the attribute frames 316 are offset by 1 frame in respective DPBs. Whereas the atlas frames 310 are offset by 3 frames in the DAB 210B and the occupancy maps 312 are offset by 3 frames in the third DPB 208B. It should be noted that any increase in DPB/DAB buffer sizes due to introduction of the delay offset shall be within the limit set by the signaled profile and level indications. An example modification of the composition time based on a delay offset per V-PCC component is provided herein for a scenario where a single sub-stream may contain interleaved maps. In such a scenario, the V-PCC decoder 102 may invoke a component collection output process. As part of such a process, the composition time may be modified using equation (5), which may be given as follows:

$$\text{compositionTime}[n][i][j] = \text{remTime}[n][i] + \text{clockTick} \times (\text{outDelay}[n][i] + \text{delayOffset}[n][i]) + \text{ClockSubTick} \times (i+j+\text{mapCnt}[i]) \quad (5)$$

where j may denote a map index that corresponds to an $i_{th}$ V-PCC component and $n_{th}$ AU of the corresponding map component. Equation (5) may be derived using equations (1), (2), and (4) of FIG. 3A.

Figure 4:
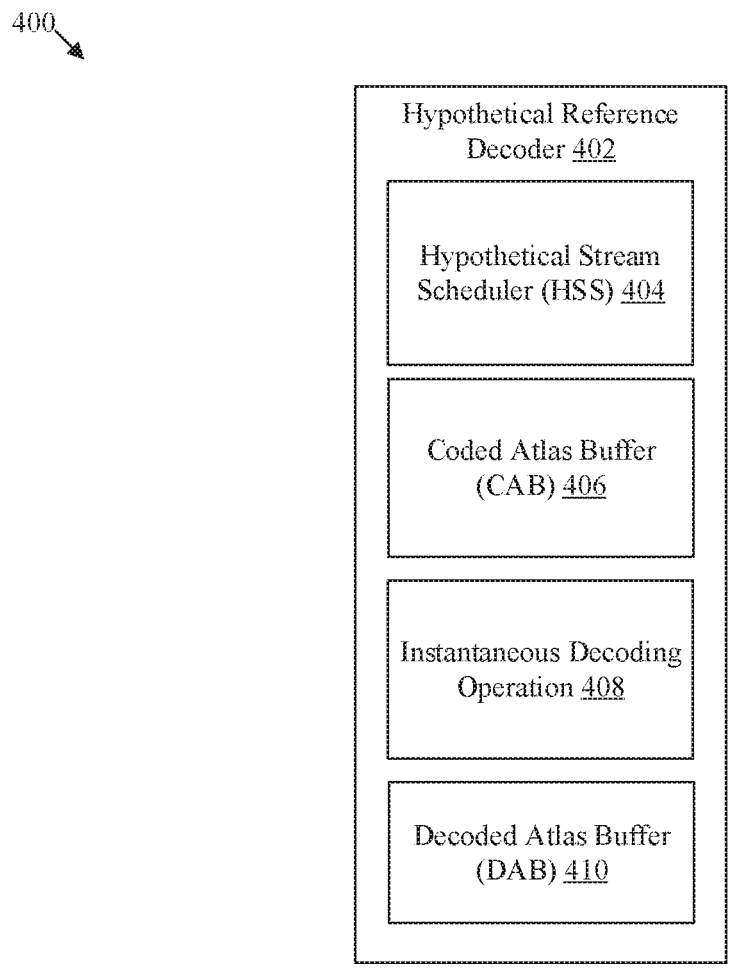
FIG. 4 is a diagram that illustrates a Hypothetical Reference Decoder (HRD) for atlas frames, in accordance with at least one embodiment of the disclosure.

FIG. 4 is a diagram that illustrates a Hypothetical Reference Decoder (HRD) for atlas frames, in accordance with at least one embodiment of the disclosure. FIG. 4 is explained in conjunction with elements from FIGS. 1, 2, 3A, and 3B. With reference to FIG. 4, there is shown a diagram 400 of a Hypothetical Reference Decoder (HRD) 402. The HRD 402 may include a Hypothetical Stream Scheduler (HSS) 404, a Coded Atlas Buffer (CAB) 406, an instantaneous decoding operation 408, and a DAB 410. The HRD 402 may be an exemplary implementation of the atlas frame decoder 210 of FIG. 2. In such an implementation, the DAB 410 may be an exemplary implementation of the DAB 210B of FIG. 2.

Each access unit may be referred to as access unit [n], where the number n identifies the particular access unit. By default, an access unit 0 is selected and the value of n is incremented by 1 for each subsequent access unit in a decoding order. Atlas frame [n] may refer to a coded atlas frame or a decoded atlas frame of the access unit [n].

In operation, the HRD 402 may be initialized at a decoding unit 0 (i.e. an access unit 0), while both the CAB 406 and the DAB 410 may be set to be empty (the DAB fullness may be set equal to 0). After initialization, the HRD 402 may not be initialized again by subsequent buffering period SEI messages. Data associated with decoding units that flow into the CAB 406 based on a specified arrival schedule may be delivered by the HSS 404. The data associated with each decoding unit may be removed and decoded instantaneously by the instantaneous decoding operation 408 at a CAB removal time of the decoding unit. Each decoded atlas frame may be placed in the DAB. A decoded atlas frame may be removed from the DAB when it becomes no longer needed for inter prediction reference and is no longer needed for output.

For each atlas bit-stream conformance test, the size of the CAB 406 (in number of bits) and the size of the DAB 410 (in number of atlas frames storage buffers) may be defined by CabSize[SchedSelIdx] and asps_max_dec_patch_frame_buffering_minus1 [HighestTid]+1, respectively. CabSize

[SchedSelIdx] may be the size of the buffer that holds coded atlas data (CAB=Coded Atlas Buffer).

Operations of the CAB 406 and the DAB 410, and the instantaneous decoding operation 408 are specified herein, for example. The HRD 402 may be initialized as specified by a buffering period SEI message. A removal timing of decoding units from the CAB 406 and an output timing of decoded atlases from the DAB 410 may be specified based on information in atlas frame timing SEI messages. All timing information relating to a specific decoding unit may arrive prior to the CAB removal time of the specific decoding unit.

The DAB 410 may contain atlas frame storage buffers. Each of the atlas frame storage buffers may contain a decoded atlas frame that may be marked as "used for reference" or may be held for future output. Before the current atlas frame is decoded (but after the slice header of the first slice of the current atlas frame is parsed), the removal of atlas frames from the DAB 410 may happen instantaneously at the CAB removal time (AuCabRemovalTime[n]) of the first decoding unit of an access unit n (containing the current atlas frame). For each atlas frame that is removed from the DAB 410, the DAB fullness is decremented by one.

If AtlasFrameOutputFlag is equal to 1 and DabOutputTime[n] is equal to AuCabRemovalTime[n], then the current atlas frame may be outputted. Otherwise, if AtlasFrameOutputFlag is equal to 0, the current atlas frame may not be outputted, but may be stored in the DAB 410. Otherwise, if AtlasFrameOutputFlag is equal to 1 and DabOutputTime[n] is greater than AuCabRemovalTime[n]), then the current atlas frame may be outputted later and may be stored in the DAB 410. In such a case, the current atlas frame may be outputted at time DabOutputTime[n] unless indicated not to output by the decoding or inference of no_output_of_prior_patch_frames_flag equal to 1 at a time that precedes DabOutputTime[n]. Here, no_output_of_prior_patch_frames_flag may be a flag that indicates that the decoded atlas will not be output for display.

In an embodiment, the current decoded atlas frame may be stored in the DAB 410 in an empty atlas frame storage buffer and the DAB fullness may be incremented by one. When asps_long_term_ref_atlas_frames_flag is equal to 1, this atlas frame is marked as "used for long-term reference". asps_long_term_ref_atlas_frames_flag equal to 0 may specify that no long-term reference atlas frame is used for inter prediction of any coded atlas frame in the CAS. asps_long_term_ref_atlas_frames_flag equal to 1 may specify that long term reference atlas frames may be used for inter prediction of one or more coded atlas frames in the CAS.

After all the tile groups of the current atlas frame are decoded, this atlas frame may be marked as "used for short-term reference". It should be noted that unless more memory than required by the level limit is available for storage of decoded atlas frames, decoders should start storing decoded parts of the current atlas frames into the DAB 410 when the first tile group is decoded and should continue to store more decoded samples as the decoding process proceeds. Immediately after the current atlas frame is decoded, the current decoded atlas frame may be removed from the DAB 410 at the CAB removal time of the last decoding unit of access unit n (containing the current atlas frame), and the DAB fullness may be decremented by one.

Figure 5:
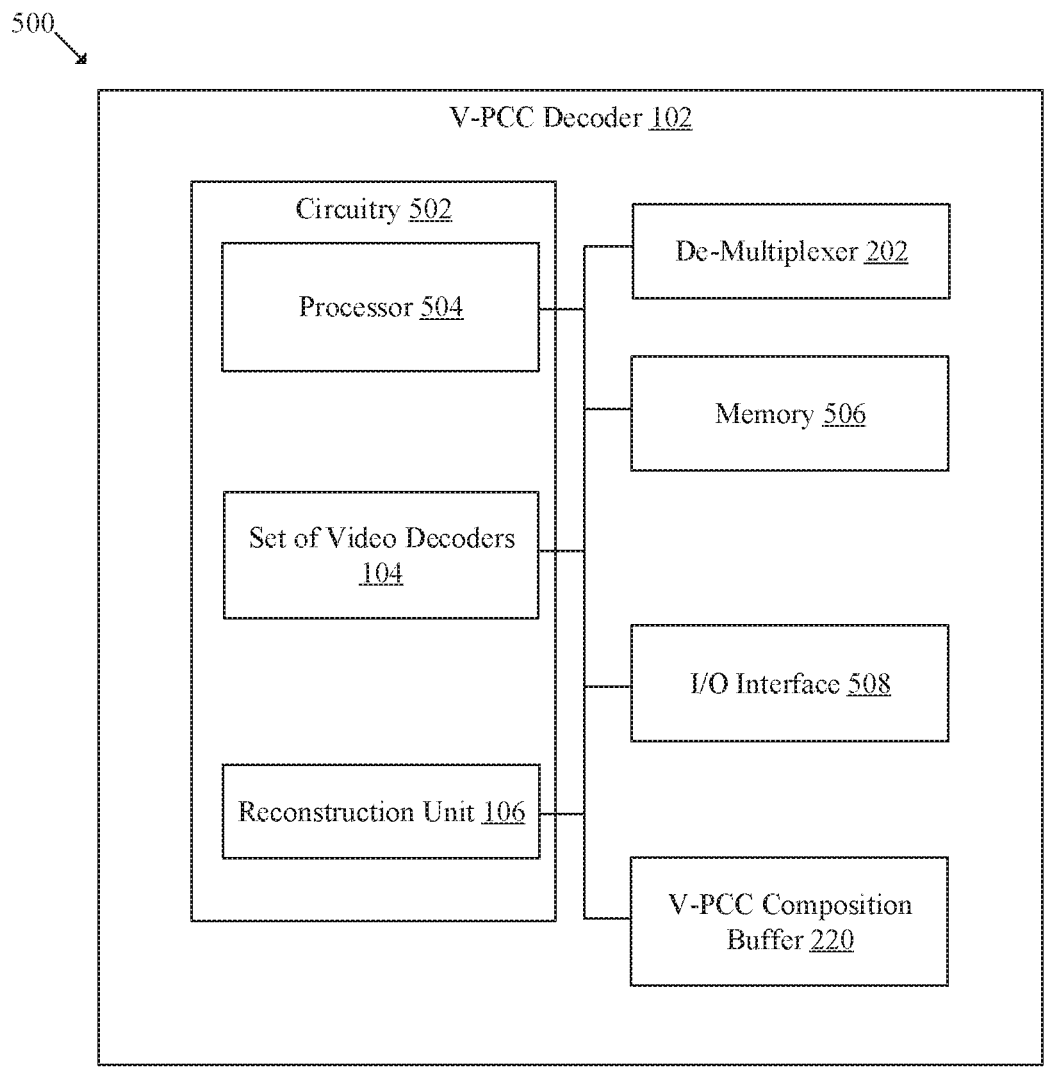
FIG. 5 is a block diagram of the V-PCC decoder of FIG. 1, in accordance with an embodiment of the disclosure.

FIG. 5 is a block diagram of the V-PCC decoder of FIG. 1, in accordance with an embodiment of the disclosure. FIG. 5 is explained in conjunction with elements from FIGS. 1, 2, 3A, 3B, and 4. With reference to FIG. 5, there is shown a block diagram 500 of the V-PCC decoder 102. The V-PCC decoder 102 may include the de-multiplexer 202 and circuitry 502, which may include a processor 504, the group of video decoders 104 (and associated with CPBs/CAB and DPBs/DAB), and the reconstruction unit 106. In an embodiment, the V-PCC decoder 102 may also include a memory 506, an input/output (I/O) interface 508, and the V-PCC composition buffer 220.

The processor 504 may include suitable logic, circuitry, and/or interfaces that may be configured to execute program instructions associated with decoding of the V-PCC bit-stream 108 and a frame-by-frame reconstruction of the point cloud sequence from V-PCC components obtained from the decoded V-PCC bit-stream 108. The processor 504 may be implemented based on a number of processor technologies known in the art. Examples implementations of the processor 504 may include, but are not limited to, a Reduced Instruction Set Computing (RISC) processor, an Application-Specific Integrated Circuit (ASIC) processor, a Complex Instruction Set Computing (CISC) processor, a Graphics Processing Unit (GPU), a microcontroller, a co-processor, a central processing unit (CPU), and/or a combination thereof.

The memory 506 may include suitable logic, circuitry, and/or interfaces that may be configured to store the program instructions executable by the processor 504. The memory 506 may be configured to store information which may be required (or generated) at any stage of operation of the circuitry 502. Examples implementations of the memory 506 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), or a CPU cache.

The I/O interface 508 may include suitable logic, circuitry, interfaces, and/or code that may be configured to act as a communication interface between different components, such as the de-multiplexer 202, the circuitry 502, the memory 506, and the V-PCC composition buffer 220.

Modifications, additions, or omissions may be made to the block diagram 200 of the V-PCC decoder 102, without departing from the scope of the present disclosure. For example, in some embodiments, the block diagram 500 may include any number of other components that may not be explicitly illustrated or described. The functions or operations executed by the V-PCC decoder 102, as described in FIG. 1, FIG. 2, FIGS. 3A-3B, and FIG. 6, may be performed by the circuitry 502.

Figure 6:
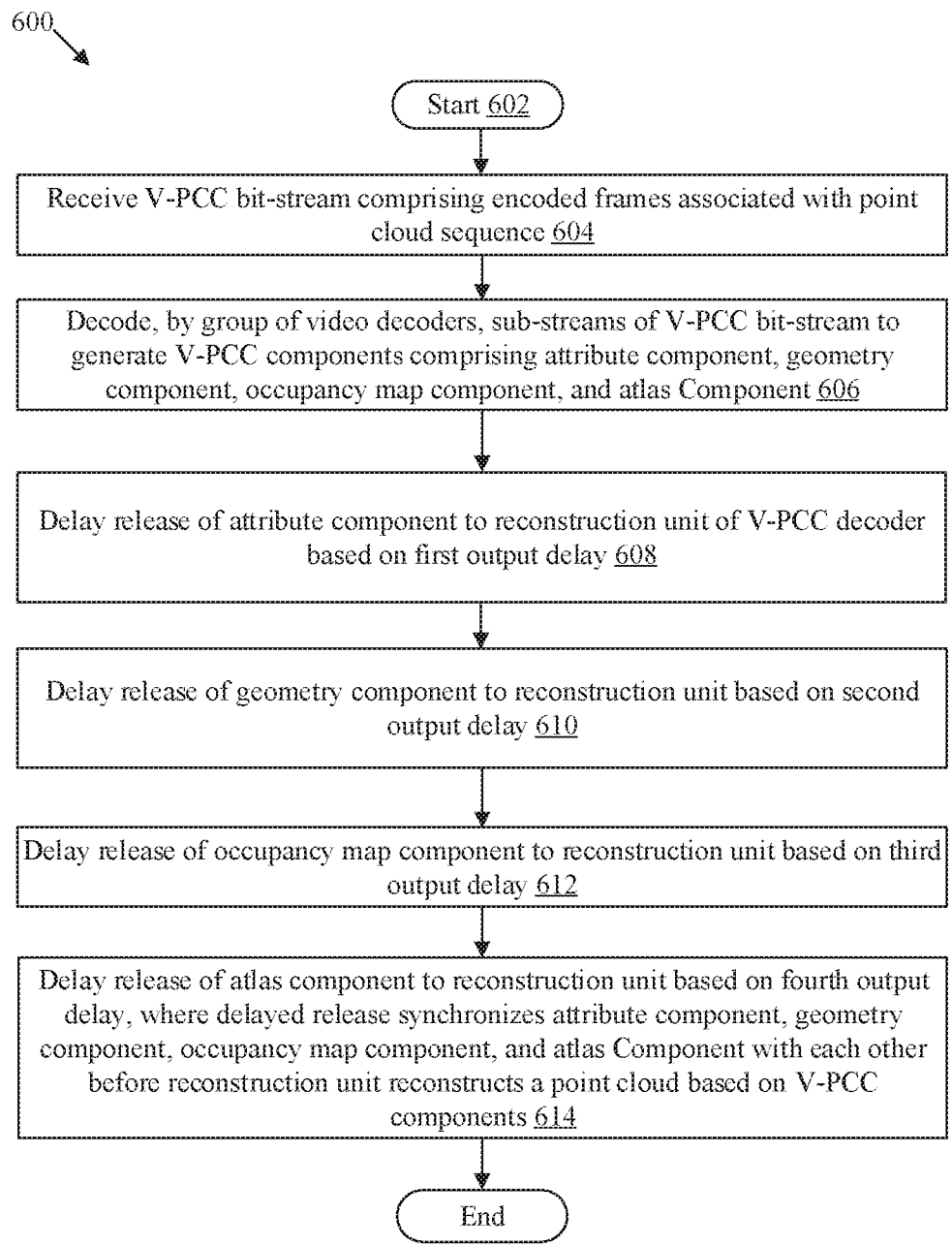
FIG. 6 is a flowchart that illustrates exemplary operations for synchronization of decoded frames before point cloud reconstruction, in accordance with an embodiment of the disclosure.

FIG. 6 is a flowchart that illustrates exemplary operations for synchronization of decoded frames before point cloud reconstruction, in accordance with an embodiment of the disclosure. FIG. 6 is explained in conjunction with elements from FIGS. 1, 2, 3A, 3B, 4, and 5. With reference to FIG. 6, there is shown a flowchart 600. The method illustrated in the flowchart 600 may be executed by any computing system, such as by the V-PCC decoder 102 of FIG. 1. The method may start at 602 and proceed to 604.

At 604, the V-PCC bit-stream 108 may be received. The V-PCC bit-stream 108 may include encoded frames associated with a point cloud sequence. In an embodiment, the circuitry 502 may be configured to receive the V-PCC bit-stream 108 which includes encoded frames associated with a point cloud sequence.

At 606, sub-streams of the V-PCC bit-stream 108 may be decoded to generate V-PCC components, such as the attribute component 212, the geometry component 214, the occupancy map component 216, and the atlas component 218. In an embodiment, the circuitry 502 may include the group of video decoders 104 which may be configured to decode the sub-streams of the V-PCC bit-stream 108 to generate the V-PCC components.

At 608, a release of the attribute component 212 to the reconstruction unit 106 of the V-PCC decoder 102 may be delayed based on a first output delay. In an embodiment, the circuitry 502 of the V-PCC decoder 102 may be configured to delay the release of the attribute component 212 to the reconstruction unit 106 based on the first output delay. In an embodiment, the circuitry 502 may be configured to delay the release of the attribute frames from the first DPB 204B. In such a case, the first output delay may be a DPB output delay, which may be included in a first picture timing SEI message associated an access unit of an attribute sub-stream of the V-PCC bit-stream 108.

At 610, a release of the geometry component 214 to the reconstruction unit 106 of the V-PCC decoder 102 may be delayed based on a second output delay. In an embodiment, the circuitry 502 of the V-PCC decoder 102 may be configured to delay the release of the geometry component 214 to the reconstruction unit 106 based on the second output delay. In an embodiment, the circuitry 502 may be configured to delay the release of the geometry frames from the second DPB 206B. In such a case, the second output delay may be a DPB output delay included in a second picture timing SEI message associated an access unit of a geometry sub-stream of the V-PCC bit-stream 108.

At 612, a release of the occupancy map component 216 to the reconstruction unit 106 of the V-PCC decoder 102 may be delayed based on a third output delay. In an embodiment, the circuitry 502 of the V-PCC decoder 102 may be configured to delay the release of the occupancy map component 216 to the reconstruction unit 106 based on the third output delay. In an embodiment, the circuitry 502 may be configured to delay the release of the occupancy map component 216 from the third DPB 208B. In such a case, the third output delay may be a DPB output delay included in a third picture timing SEI message associated an access unit of an occupancy map sub-stream of the V-PCC bit-stream 108.

At 614, a release of the atlas component 218 to the reconstruction unit 106 of the V-PCC decoder 102 may be delayed based on a fourth output delay. In an embodiment, the circuitry 502 of the V-PCC decoder 102 may be configured to delay the release of the atlas component 218 to the reconstruction unit 106 based on the fourth output delay. In an embodiment, the circuitry 502 may be configured to delay the release of the atlas component 218 from the DAB 210B. In such a case, the fourth output delay may be a DAB output delay included in an atlas timing SEI message associated an access unit of an atlas sub-stream of the V-PCC bit-stream 108. The delayed release at 608, 610, 612, and 614 may synchronize (i.e. temporally align) the attribute component 212, the geometry component 214, the occupancy map component 216, and the atlas component 218 with each other before the reconstruction unit 106 reconstructs the point cloud 222 based on such released components. Control may pass to end.

Various embodiments of the disclosure may provide a non-transitory computer readable medium and/or storage medium having stored thereon, instructions executable by a machine and/or a computer to operate a system (for example, the V-PCC decoder 102). The instructions may cause the machine and/or computer to perform operations that include receiving the V-PCC bit-stream 108 which includes encoded frames associated with a point cloud sequence and decoding, by the group of video decoders 104, sub-streams of the V-PCC bit-stream 108 to generate V-PCC components. Such components include an attribute component, a geometry component, an occupancy map component, and an atlas component. The operations further include delaying a release of the attribute component to the reconstruction unit 106 of the V-PCC decoder 102 based on a first output delay and delaying a release of the geometry component to the reconstruction unit 106 based on a second output delay. The operations further include delaying a release of the occupancy map component to the reconstruction unit 106 based on a third output delay and delaying a release of the atlas component to the reconstruction unit 106 based on a fourth output delay. The delayed release may synchronize the attribute component, the geometry component, the occupancy map component, and the atlas component with each other before the reconstruction unit 106 reconstructs a point cloud based on such released components.

Exemplary aspects of the disclosure may provide a V-PCC decoder (such as, the V-PCC decoder 102 of FIG. 1) that includes circuitry (such as the circuitry 502). The circuitry 502 may be configured to receive the V-PCC bit-stream 108 which includes encoded component associated with a point cloud sequence. The circuitry 502 may include the group of video decoders 104 which may be configured to decode sub-streams of the V-PCC bit-stream to generate V-PCC components, such as an attribute component 212, a geometry component 214, an occupancy map component 216, and an atlas component 218. The circuitry 502 may be further configured to delay a release of the attribute component 212 to the reconstruction unit 106 of the V-PCC decoder 102 based on a first output delay and delay a release of the geometry component 214 to the reconstruction unit 106 based on a second output delay. The circuitry 502 may be further configured to delay a release of the occupancy map component 216 to the reconstruction unit 106 based on a third output delay and delay a release of the atlas component 218 to the reconstruction unit 106 based on a fourth output delay. The delayed release may synchronize (i.e. temporally align) the attribute component 212, the geometry component 214, the occupancy map component 216, and the atlas component 218 with each other before the reconstruction unit 106 reconstructs a point cloud (such as the point cloud 222) based on the such components.

In an embodiment, the circuitry 502 may be further configured to receive a first picture timing Supplemental Enhancement Information (SEI) message associated with an attribute sub-stream of the V-PCC bit-stream 108. The circuitry 502 may extract the first output delay from the received first picture timing SEI message and may determine a delay offset associated with the attribute component 212 based on the extracted first output delay. The circuitry 502 may update a first composition time at which the attribute component 212 is to be removed from the first DPB 204B. The first composition time may be updated based on the extracted first output delay and the determined offset delay. The circuitry 502 may remove the attribute component 212 from the first DPB 204B at the updated first composition time. The removal of the attributed component may correspond to the delayed release of the attribute component 212.

In an embodiment, the circuitry 502 may be further configured to receive a second picture timing Supplemental Enhancement Information (SEI) message associated with a geometry sub-stream of the V-PCC bit-stream 108. The circuitry 502 may extract the second output delay from the received second picture timing SEI message and may determine a delay offset associated with the geometry component

214 based on the extracted second output delay. The circuitry 502 may update a second composition time at which the geometry component 214 is to be removed from the second DPB 206B. The second composition time may be updated based on the extracted second output delay and the determined delay offset. The circuitry 502 may remove the geometry component 214 from the second DPB 206B at the updated second composition time. The removal of the geometry component 214 may correspond to the delayed release of the geometry component 214.

In an embodiment, the circuitry 502 may be further configured to receive a third picture timing Supplemental Enhancement Information (SEI) message associated with an occupancy map sub-stream of the V-PCC bit-stream 108. The circuitry 502 may extract the third output delay from the received third picture timing SEI message and may determine a delay offset associated with the occupancy map component 216 based on the extracted third output delay. Thereafter, the circuitry 502 may update a third composition time at which the occupancy map component 216 is to be removed from the third DPB 208B. The third composition time may be updated based on the extracted third output delay and the determined delay offset. The circuitry 502 may remove the occupancy map component 216 from the third DPB 208B at the updated third composition time. The removal of the occupancy map component 216 may correspond to the delayed release of the occupancy map component 216.

In an embodiment, the circuitry 502 may be further configured to receive an atlas timing Supplemental Enhancement Information (SEI) message associated with an atlas sub-stream of the V-PCC bit-stream 108. The circuitry 502 may extract the fourth output delay from the received atlas timing SEI message and may determine a delay offset associated with the atlas component 218 based on the extracted fourth output delay. Thereafter, the circuitry 502 may update a fourth composition time at which the atlas component 218 is to be removed from the DAB 210B. The fourth composition time may be updated based on the extracted fourth output delay and the determined delay offset. The circuitry 502 may remove the atlas component 218 from the DAB 210B at the updated fourth composition time. The removal of the atlas component 218 may correspond to the delayed release of the atlas component 218.

In an embodiment, the circuitry 502 may be further configured to store the attribute component 212 in the V-PCC composition buffer 220 of the V-PCC decoder 102, after the attribute sub-stream is decoded. Similarly, the circuitry 502 may be further configured to store the geometry component 214, the occupancy map component 216, and the atlas component 218 in the V-PCC composition buffer 220, after each of the geometry sub-stream, the occupancy map sub-stream, and the atlas sub-stream is decoded, respectively.

For each of the stored attribute component 212, the stored geometry component 214, the stored occupancy map component 216, and the stored atlas component 218, the circuitry 502 may be configured to modify a composition time for a removal from the V-PCC composition buffer 220. The composition time may be modified based on one of: the first output delay, the second output delay, the third output delay, and the fourth output delay. The circuitry 502 may be further configured to remove each of the stored attribute component 212, the stored geometry component 214, the stored occupancy map component 216, and the stored atlas component 218 from the V-PCC composition buffer 220 at the modified composition time associated with the respective component.

The removal of each of the stored attribute component 212, the stored geometry component 214, the stored occupancy map component 216, and the stored atlas component 218 may correspond to the delayed release to the reconstruction unit 106.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A method, comprising:
   in a Video-Based Point Cloud Compression (V-PCC) decoder:
   receiving a V-PCC bit-stream;
   demultiplexing the received V-PCC bit-stream into a plurality of sub-streams comprising an attribute sub-stream, a geometry sub-stream, an occupancy map sub-stream, and an atlas sub-stream;
   decoding, by a group of video decoders, the plurality of sub-streams to generate a plurality of V-PCC components comprising an attribute component, a geometry component, an occupancy map component, and an atlas component;
   modifying each of a first composition time of the attribute component, a second composition time of the geometry component, a third composition time of the occupancy map component, and a fourth composition time of the atlas component, wherein
   the modification of each of the first composition time, the second composition time, the third composition time, and the fourth composition time is based on an output delay of a corresponding V-PCC component of the plurality of V-PCC components, a first clock tick duration, and a second clock tick duration, the first clock tick duration is based on a number of time units of a clock for a specific picture rate of the V-PCC bit-stream, and an operating frequency of the clock, and the second clock tick duration is a ratio of the first clock tick duration and a total number of the plurality of V-PCC components;

delaying a release of the attribute component to a reconstruction unit of the V-PCC decoder based on the modified first composition time;

delaying a release of the geometry component to the reconstruction unit based on the modified second composition time;

delaying a release of the occupancy map component to the reconstruction unit based on the modified third composition time; and delaying a release of the atlas component to the reconstruction unit based on the modified fourth composition time, wherein the delayed release of each of the attribute component, the geometry component, the occupancy map component, and the atlas component synchronizes the attribute component, the geometry component, the occupancy map component, and the atlas component with each other before the reconstruction unit reconstructs a point cloud based on the plurality of V-PCC components.

2. The method according to claim 1, further comprising receiving a first picture timing Supplemental Enhancement Information (SEI) message associated with the attribute sub-stream of the V-PCC bit-stream.

3. The method according to claim 2, wherein the delaying of the release of the attribute component comprises:

extracting a first output delay from the received first picture timing SEI message, wherein the first output delay corresponds to the output delay of the attribute component;

determining a delay offset associated with the attribute component, based on the extracted first output delay;

modifying the first composition time at which the attribute component is to be removed from a first decoded picture buffer associated with attribute video decoder, wherein the first composition time is further modified based on the extracted first output delay and the determined delay offset; and removing the attribute component from the first decoded picture buffer at the modified first composition time.

4. The method according to claim 1, further comprising receiving a second picture timing Supplemental Enhancement Information (SEI) message associated with the geometry sub-stream of the V-PCC bit-stream.

5. The method according to claim 4, wherein the delaying of the release of the geometry component comprises:

extracting a second output delay from the received second picture timing SEI message, wherein the second output delay corresponds to the output delay of the geometry component;

determining a delay offset associated with the geometry component, based on the extracted second output delay;

modifying the second composition time at which the geometry component is to be removed from a second decoded picture buffer associated with geometry video decoder, wherein the second composition time is further modified based on the extracted second output delay and the determined delay offset; and removing the geometry component from the second decoded picture buffer at the modified second composition time.

6. The method according to claim 1, further comprising receiving a third picture timing Supplemental Enhancement Information (SEI) message associated with the occupancy map sub-stream of the V-PCC bit-stream.

7. The method according to claim 6, wherein the delaying of the release of the occupancy map component comprises:

extracting a third output delay from the received third timing SEI message, wherein the third output delay corresponds to the output delay of the occupancy map component;

determining a delay offset associated with the occupancy map component, based on the extracted third output delay;

modifying the third composition time at which the occupancy map component is to be removed from a third decoded picture buffer associated with occupancy map decoder, wherein the third composition time is further modified based on the extracted third output delay and the determined delay offset; and removing the occupancy map component from the third decoded picture buffer at the modified third composition time.

8. The method according to claim 1, further comprising receiving an atlas timing Supplemental Enhancement Information (SEI) message associated with the atlas sub-stream of the V-PCC bit-stream.

9. The method according to claim 8, wherein the delaying of the release of the atlas component comprises:

extracting a fourth output delay from the received atlas timing SEI message; wherein the fourth output delay corresponds to the output delay of the atlas component;

determining a delay offset associated with the atlas component, based on the extracted fourth output delay;

modifying the fourth composition time at which the atlas component is to be removed from a decoded atlas buffer associated with atlas frame decoder, wherein the fourth composition time is further modified based on the extracted fourth output delay and the determined delay offset; and removing the atlas component from the decoded atlas buffer at the modified fourth composition time.

10. The method according to claim 1, further comprising:

after the decoding, storing the attribute component in a V-PCC composition buffer of the V-PCC decoder;

after the decoding, storing the geometry component in the V-PCC composition buffer;

after the decoding, storing the occupancy map component in the V-PCC composition buffer; and after the decoding, storing the atlas component in the V-PCC composition buffer.

11. The method according to claim 10, further comprising removing each of the stored attribute component, the stored geometry component, the stored occupancy map component, and the stored atlas component from the V-PCC composition buffer at the modified first composition time, the modified second composition time, the modified third composition time, and the modified fourth composition time, respectively, wherein the removal of each of the stored attribute component, the stored geometry component, the stored occupancy map component, and the stored atlas component corresponds to the delayed release to the reconstruction unit.

12. A Video-Based Point Cloud Compression (V-PCC) decoder, comprising:
 circuitry configured to:
  receive a V-PCC bit-stream;
  demultiplex the received V-PCC bit-stream into a plurality of sub-streams comprising an attribute sub-stream, a geometry sub-stream, an occupancy map sub-stream, and an atlas sub-stream;
  decode the plurality of sub-streams to generate a plurality of V-PCC components comprising an attribute component, a geometry component, an occupancy map component, and an atlas component;
  modify each of a first composition time of the attribute component, a second composition time of the geometry component, a third composition time of the occupancy map component, and a fourth composition time of the atlas component, wherein
   the modification of each of the first composition time, the second composition time, the third composition time, and the fourth composition time is based on an output delay of a corresponding V-PCC component of the plurality of V-PCC components, a first clock tick duration, and a second clock tick duration,
   the first clock tick duration is based on a number of time units of a clock for a specific picture rate of the V-PCC bit-stream, and an operating frequency of the clock, and
   the second clock tick duration is a ratio of the first clock tick duration and a total number of the plurality of V-PCC components;
  delay a release of the attribute component to a reconstruction unit of the V-PCC decoder based on the modified first composition time;
  delay a release of the geometry component to the reconstruction unit based on the modified second composition time;
  delay a release of the occupancy map component to the reconstruction unit based on the modified third composition time; and
  delay a release of the atlas component to the reconstruction unit based on the modified fourth composition time,
   wherein the delayed release of each of the attribute component, the geometry component, the occupancy map component, and the atlas component synchronizes the attribute component, the geometry component, the occupancy map component, and the atlas component with each other before the reconstruction unit reconstructs a point cloud based on the plurality of V-PCC components.

13. The V-PCC decoder according to claim 12, wherein the circuitry is further configured to:
 receive a first picture timing Supplemental Enhancement Information (SEI) message associated with the attribute sub-stream of the V-PCC bit-stream;
 extract a first output delay from the received first picture timing SEI message; wherein the first output delay corresponds to the output delay of the attribute component;
 determine a delay offset associated with the attribute component, based on the extracted first output delay;
 modify the first composition time at which the attribute component is to be removed from a first decoded picture buffer associated with attribute video decoder, wherein the first composition time is further modified based on the extracted first output delay and the determined delay offset; and
 remove the attribute component from the first decoded picture buffer at the modified first composition time, wherein the removal corresponds to the delayed release of the attribute component.

14. The V-PCC decoder according to claim 12, wherein the circuitry is further configured to:
 receive a second picture timing Supplemental Enhancement Information (SEI) message associated with the geometry sub-stream of the V-PCC bit-stream;
 extract a second output delay from the received second picture timing SEI message, wherein the second output delay corresponds to the output delay of the geometry component;
 determine a delay offset associated with the geometry component, based on the extracted second output delay;
 modify the second composition time at which the geometry component is to be removed from a second decoded picture buffer associated with geometry video decoder, wherein the second composition time is further modified based on the extracted second output delay and the determined delay offset; and
 remove the geometry component from the second decoded picture buffer at the modified second composition time, wherein the removal corresponds to the delayed release of the geometry component.

15. The V-PCC decoder according to claim 12, wherein the circuitry is further configured to:
 receive a third picture timing Supplemental Enhancement Information (SEI) message associated with the occupancy map sub-stream of the V-PCC bit-stream;
 extract a third output delay from the received third timing SEI message, wherein the third output delay corresponds to the output delay of the occupancy map component;
 determine a delay offset associated with the occupancy map component, based on the extracted third output delay;
 modify the third composition time at which the occupancy map component is to be removed from a third decoded picture buffer associated with occupancy map decoder, wherein the third composition time is further modified based on the extracted third output delay and the determined delay offset; and
 remove the occupancy map component from the third decoded picture buffer at the modified third composition time, wherein the removal corresponds to the delayed release of the occupancy map component.

16. The V-PCC decoder according to claim 12, wherein the circuitry is further configured to receive an atlas timing Supplemental Enhancement Information (SEI) message associated with the atlas sub-stream of the V-PCC bit-stream.

17. The V-PCC decoder according to claim 16, wherein the circuitry is further configured to:
 extract a fourth output delay from the received atlas timing SEI message; wherein the fourth output delay corresponds to the output delay of the atlas component;
 determine a delay offset associated with the atlas component, based on the extracted fourth output delay;
 modify the fourth composition time at which the atlas component is to be removed from a decoded atlas buffer associated with atlas frame decoder, wherein the fourth composition time is further modified based on the extracted fourth output delay and the determined delay offset; and remove the atlas component from the decoded atlas buffer at the modified fourth composition time, wherein the removal corresponds to the delayed release of the atlas component.

18. The V-PCC decoder according to claim 12, wherein the circuitry is further configured to:

after the decode, store the attribute component in a V-PCC composition buffer of the V-PCC decoder;

after the decode, store the geometry component in the V-PCC composition buffer;

after the decode, store the occupancy map component in the V-PCC composition buffer; and after the decode, store the atlas component in the V-PCC composition buffer.

19. The V-PCC decoder according to claim 18, wherein the circuitry is further configured to remove each of the stored attribute component, the stored geometry component, the stored occupancy map component, and the stored atlas component from the V-PCC composition buffer at the modified first composition time, the modified second composition time, the modified third composition time, and the modified fourth composition time, respectively, and the removal of each of the stored attribute component, the stored geometry component, the stored occupancy map component, and the stored atlas component corresponds to the delayed release to the reconstruction unit.

* * * * *